United States Patent
AlTammar et al.

(10) Patent No.: US 12,146,382 B2
(45) Date of Patent: Nov. 19, 2024

(54) METHOD FOR IMPROVING OIL AND GAS WELL PRODUCTIVITY AND ENCAPSULATED LUBRICATING FRAC FLUID ADDITIVE BY LUBRICATION OF STIMULATED RESERVOIR VOLUME

(71) Applicant: SAUDI ARABIAN OIL COMPANY, Dhahran (SA)

(72) Inventors: Murtadha J. AlTammar, Dhahran (SA); Abeer A. Alarawi, Al Khobar (SA); Khalid Mohammed Alruwaili, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/301,734

(22) Filed: Apr. 17, 2023

(65) Prior Publication Data

US 2024/0344418 A1    Oct. 17, 2024

(51) Int. Cl.
*E21B 43/26* (2006.01)
*C09K 8/502* (2006.01)
*C09K 8/504* (2006.01)
*C09K 8/516* (2006.01)
(Continued)

(52) U.S. Cl.
CPC ............ *E21B 33/138* (2013.01); *C09K 8/502* (2013.01); *C09K 8/5045* (2013.01); *C09K 8/516* (2013.01); *C09K 8/665* (2013.01); *E21B 43/26* (2013.01); *C09K 2208/34* (2013.01)

(58) Field of Classification Search
None
See application file for complete search history.

(56) References Cited

U.S. PATENT DOCUMENTS 11,466,199 B1    10/2022    Li et al.
2013/0217602 A1*  8/2013    Otto .................. E21B 21/00
                                                507/105
(Continued)

OTHER PUBLICATIONS

Kumar et al., Optimizing drawdown strategies in wells producing from complex fracture networks. Society of Petroleum Engineers, International Hydraulic Fracturing Technology Conference and Exhibition, Muscat, Oman, Oct. 16-18, 2018, SPE-191419-18IHFT-MS, 14 pages.
(Continued)

*Primary Examiner* — Andrew Sue-Ako
(74) *Attorney, Agent, or Firm* — Osha Bergman Watanabe & Burton LLP

(57) ABSTRACT

A method for improving oil and gas well productivity includes introducing a lubricating agent into a microfracture in a subterranean formation, coating at least a portion of a first surface and a second surface of the microfracture with the lubricating agent to produce a coated microfracture; and, providing a sufficient time for the coated microfracture to close. The introducing, the coating and the providing cause the first surface and the second surface of the coated microfracture to misalign after the closure of the coated microfracture and an opening to form between the first surface and the second surface. An encapsulated lubricating agent includes 30 to 50 wt % of a lubricating agent, and 50 to 70 wt % of an encapsulant encapsulating at least a portion of the lubricating agent.

10 Claims, 3 Drawing Sheets

(51) Int. Cl.
    *C09K 8/66*     (2006.01)
    *E21B 33/138*     (2006.01)

(56) References Cited

U.S. PATENT DOCUMENTS

| | | | |
|---|---|---|---|
| 2015/0007995 A1* | 1/2015 | Livescu | E21B 21/00 |
| | | | 166/305.1 |
| 2015/0065398 A1* | 3/2015 | Gartland | C09K 8/54 |
| | | | 507/136 |
| 2017/0349815 A1* | 12/2017 | Ozden | C09K 8/32 |
| 2018/0010435 A1 | 1/2018 | Nguyen et al. | |
| 2018/0305609 A1* | 10/2018 | Hall | C09K 8/60 |
| 2019/0345375 A1 | 11/2019 | Nguyen et al. | |
| 2020/0231864 A1 | 7/2020 | Saini et al. | |
| 2021/0261855 A1* | 8/2021 | Xu | C09K 8/68 |

OTHER PUBLICATIONS

Sagoff, "Graphene layers dramatically reduce wear and friction on sliding steel surfaces," Argonne National Laboratory, Apr. 25, 2013, 4 pages. Retrieved from URL: https://www.anl.gov/article/graphene-layers-dramatically-reduce-wear-and-friction-on-sliding-steel-surfaces.

Shahnazar et al., "Enhancing lubricant properties by nanoparticle additives," International Journal of Hydrogen Energy, 41(4), pp. 3153-3170, Jan. 6, 2016, 18 pages.

M. Sharma and R. Manchanda, "The Role of Induced Un-propped (IU) Fractures in Unconventional Oil and Gas Wells." Paper presented at the SPE Annual Technical Conference and Exhibition, Houston, Texas, USA, Sep. 2015, SPE-174946-MS, 14 pages.

* cited by examiner

METHOD FOR IMPROVING OIL AND GAS WELL PRODUCTIVITY AND ENCAPSULATED LUBRICATING FRAC FLUID ADDITIVE BY LUBRICATION OF STIMULATED RESERVOIR VOLUME

BACKGROUND

Hydraulic fracturing ("fracking") is a well stimulation operation in which fluids ("fracking fluid", "frac fluid") are pumped through an oil and gas well to create new fractures or open exiting fractures in subterranean formations to increase the amount of extracted hydrocarbon and overall well productivity. An induced network of hydraulic fractures and reopened fractures are referred to as stimulated reservoir volume (SRV).

The fracking fluid generally contains proppants, which are solid particle materials such as sand, designed to keep the fractures open. The proppants are generally introduced to the fractures with the fracking fluid, and act as an obstacle to prevent the fractures from closing due to the stresses present within the formation. Fractures that are smaller in size ("microfractures") may also form during the fracking operation or may naturally exist within the formation, including shales and low permeability rocks. Microfractures which are too small to accommodate the proppants generally close over time, for example, during flow back and extraction operations. The closure of microfractures negatively affects the productivity of the well because hydrocarbon generally cannot be extracted from the closed microfractures. Accordingly, there exists a need for the development of a method for improving oil and gas well productivity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for improving oil and gas well productivity. The method includes introducing a lubricating agent into a microfracture in a subterranean formation, coating at least a portion of a first surface and a second surface of the microfracture with the lubricating agent to produce a coated microfracture; and, providing a sufficient time for the coated microfracture to close. The introducing, the coating and the providing cause the first surface and the second surface of the coated microfracture to misalign after the closure of the coated microfracture and an opening to form between the first surface and the second surface.

In another aspect, embodiments disclosed herein relate to an encapsulated lubricating agent including 30 to 50 wt % of a lubricating agent, and 50 to 70 wt % of an encapsulant encapsulating at least a portion of the lubricating agent.

Other aspects and advantages of the claimed subject matter will be apparent from the following description and the appended claims.

DETAILED DESCRIPTION

Method for Improving Oil and Gas Well Productivity

In one aspect, embodiments disclosed herein relate to a method for improving oil and gas well productivity. The method includes introducing a lubricating agent into a microfracture in a subterranean formation, coating at least a portion of a first surface and a second surface of the microfracture with the lubricating agent, and providing sufficient time for the microfracture to close.

Figure 1:
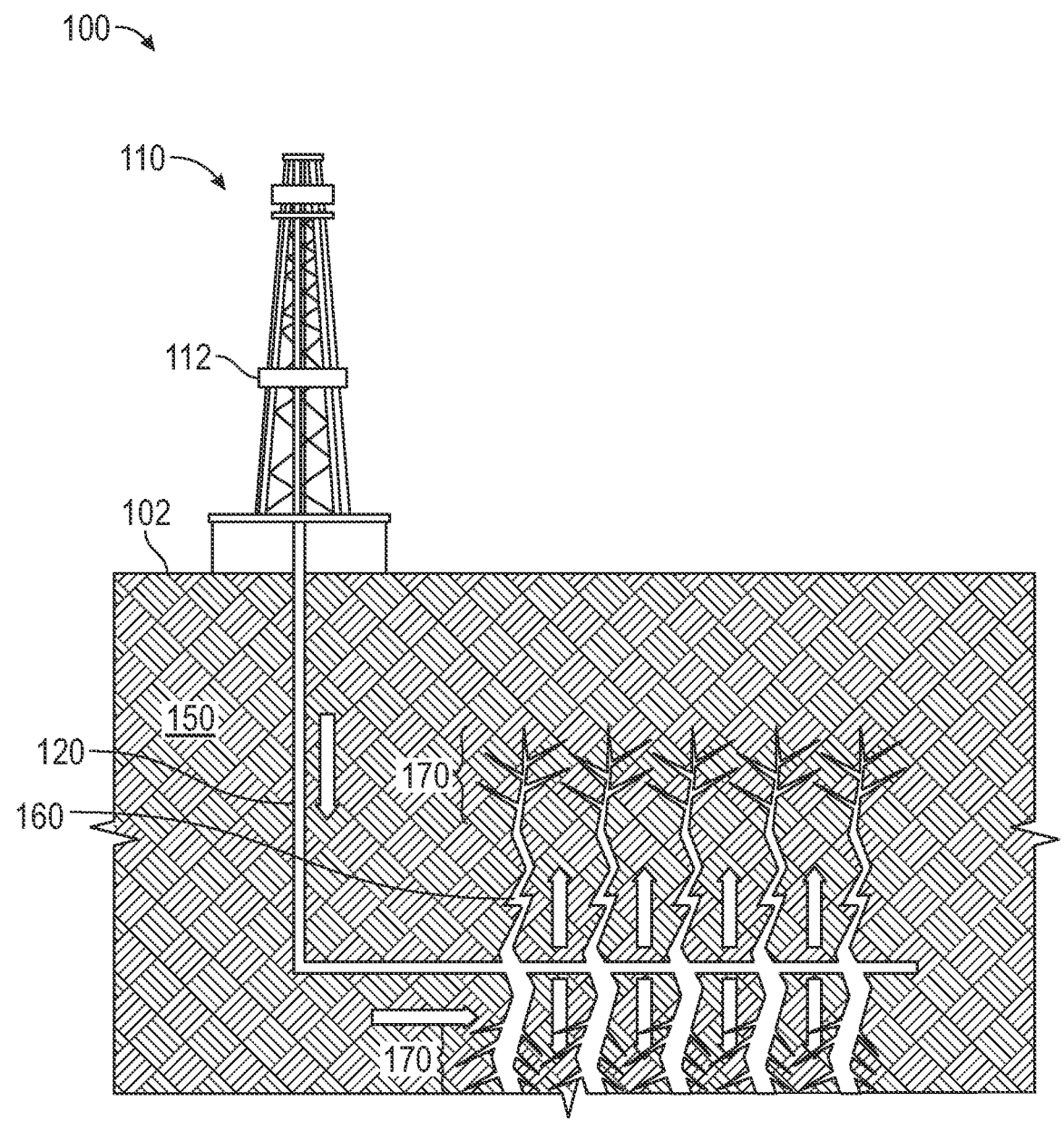
FIG. 1 is a diagram that illustrates a well environment of a hydraulic fracturing operation in accordance with one or more embodiments.

FIG. 1 is a diagram that illustrates a well environment 100 of a fracking operation. The fracking operation includes high-rate, slickwater fracturing of unconventional formations. The well environment 100 includes a well system 110 and a subterranean formation 150 ("formation"). The formation 150 includes a porous or fractured rock formation that resides underground, beneath the surface 102 of the Earth. The well system 110 includes a wellbore 120 and a rig 112. In the fracking operation, a fluid is injected by the rig 112 into the wellbore 120. The wellbore 120 may be a vertical well, a horizontal well, inclined well or combinations thereof. The rig 112 may be a drilling rig or a "Christmas tree" combined with an equipment capable of pumping fluid into the wellbore 120, such as a pump truck. A "Christmas tree" refers to an assembly of valves, casing spools and fittings placed at the top of a wellbore which is used to regulate the flow of pipes in the wellbore. Due to the hydraulic pressure of the fluid, fractures 160 form within the formation 150. Microfractures 170 also form in the formation 150, either inside of the fractures 160 or along the wall of the wellbore 120. Fractures 160 and microfractures 170 may also exist naturally within the formation 150.

In the present disclosure, a "microfracture" refer to a fracture smaller in size than a fracture 160, and incapable of accommodating proppants within due to its size. Fractures containing proppants, or "propped" fractures, do not close over time as a result of the proppants wedged within the fracture. Microfracture which do not contain proppants generally close over a period of time. Microfractures 170 may have an opening distance of about 200 µm or less.

In one or more embodiments, the method includes introducing a lubricating agent (lubricating frac fluid additive, lubricating additive) into microfractures 170 in a subterranean formation 150. The lubricating agent is a material capable of lowering the friction of the formation rock, or "lubricating" the formation rock, when placed on the surface of the formation rock In one or more embodiments, the lubricating agent includes graphene nanoparticles. Graphene may adhere strongly to the surface of the microfractures 170. A partial coating of graphene may be effective at reducing friction because of the ability of the graphene to re-orient itself during initial wear cycles, and may last a considerable length of time providing a low friction during sliding. Graphene may also be a cost-effective lubricating agent.

In one or more embodiments, the lubricating agent includes metal nanoparticles, such as nanoparticles of Cu, Fe, Al or a combination thereof. Such metal nanoparticles may substantially reduce the friction and wear between contact surfaces by forming a tribological layer. Metal nanoparticles may have desirable self-healing and mending properties.

In one or more embodiments, the lubricating agent includes metal and/or metalloid (metal/metalloid) oxide nanoparticles, such as nanoparticles of $TiO_2$, ZnO, CuO, $ZrO_2$, $CeO_2$, $Al_2O_3$, $SiO_2$, or combinations thereof. $TiO_2$ may have substantial friction reduction and anti-wear properties. ZnO may have a large surface area, and properties such as high surface energy, strong adsorption, high diffusion, ease of sintering and low melting point. ZnO may also be prepared at a low cost.

The metal/metalloid oxide nanoparticles may also include heterostructure metal/metalloid oxide nanoparticles such as $ZrAl_2O_4$, and composite or hybrid metal/metalloid oxide nanoparticles such as $Al_2O_3/TiO_2$ and $ZrO_2/SiO_2$. $ZrAl_2O_4$ nanoparticles may have high thermal stability, mechanical resistance hydrophobicity and low surface acidity, which are characteristics suitable as a material for the lubricating agent.

In one or more embodiments, the lubricating agent includes an encapsulated lubricating agent. The encapsulated lubricating agent is described in detail in the subsequent section. In one or more embodiments, the lubricating agent includes a liquid lubricating agent. Exemplary liquid lubricating agents may include, but are not limited to, emulsion of a polymer such as polyacrylamide. The liquid lubricating agent may be cationic or anionic.

In one or more embodiments, the lubricating agent has a particle size in a range of from about 1 nm to about 1000 nm, such as a lower limit selected from any one of 1, 10, 20, 30, 40, 50, 100, 150, 200, 250 and 300 nm to an upper limit selected from any one of 10, 20, 30, 40, 50, 100, 150, 200, 250, 300, 400, 500, 600, 700, 800, 900 and 1000 nm, where any lower limit may be combined with any mathematically compatible upper limit. A particle size of the lubricating agent refers to as the largest dimension of the lubricating agent. Embodiments in which the lubricating agent is a sphere, the size represents the diameter of the sphere. Embodiments in which the lubricating agent has a non-equilateral shape, such as a rectangular cuboid or an ellipsoid, the size represents the distance between the 2 furthest points on the surface of the lubricating agent.

In one or more embodiments, the lubricating agent is introduced into the microfractures 170 as a lubricating agent mixture which is the lubricating agent mixed with a fluid such as a fracking fluid, water, aqueous solutions, organic solvent or a combination thereof. A fracking fluid may include water, chemical additives and proppants. The chemical additives may include, but are not limited to, microbial controlling agents, buffers, stabilizers, solvents, gelling agents, binders surfactants, pH controlling agents, mineral dissolution agents, foaming agents and corrosion inhibitors. Proppants may include sand, silica and quartz. The lubricating agent mixture is introduced into the microfractures 170 present in the formation 150 through the wellbore 120 and fractures 160.

In one or more embodiments, appropriate solvent may be chosen in order to produce a stable lubricating agent mixture. The stability of the mixture may depend on the particle size, and surface properties of the lubricating agent, and interaction between the lubricating agent and the solvent. A lubricating agent having a hydrophilic surface may be paired with an aqueous solution, and a lubricating agent having a hydrophobic surface may be paired with low-polar organic solvent.

The lubricating agent may be mixed with the fluid to produce the lubricating agent mixture prior to being introduced, or as being introduced, to the wellbore 120. The lubricating agent may be introduced into the microfracture continuously or intermittently during and/or after the fracking operation. Operations conducted after the fracking operation may include well shut-in and pressure-cycling.

In one or more embodiments, the concentration of the lubricating agent in the lubricating agent mixture is in a range of from about 0.001 wt % to 5 wt %, such as in a range of from a lower limit selected from any one of 0.001, 0.01, 0.05 and 1 wt %, to an upper limit selected from any one of 1, 2, 3, 4, and 5 wt %, where any lower limit may be paired with any mathematically compatible upper limit.

Figure 2:
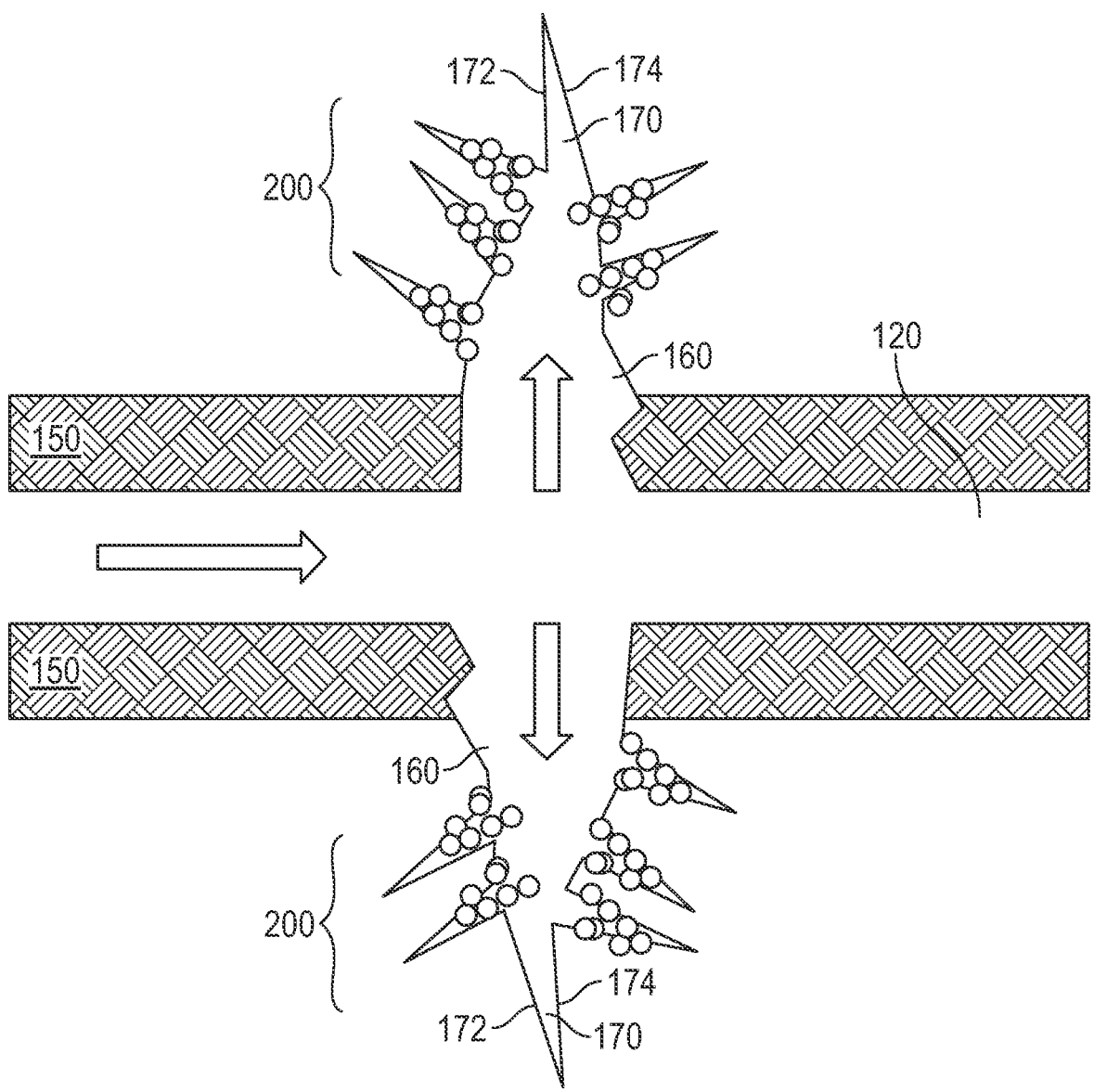
FIG. 2 is a diagram that illustrates microfractures coated with a lubricating agent in accordance with one or more embodiments.

In one or more embodiments, the method includes coating at least a portion of a first surface and a second surface of the microfracture with the lubricating agent. FIG. 2 is a diagram that illustrates microfractures coated with a lubricating agent 200 ("coated microfractures"). A lubricating agent mixture containing a lubricating agent is introduced into the wellbore 120, fractures 160 and then microfractures 170 in the formation 150. The microfractures 170 include a first surface 172 and a second surface 174. The lubricating agent enters the microfractures 170 and coats at least a portion of the first surface 172 and the second surface 174 of the microfractures 170 to produce coated microfractures 200. The surface of the coated microfracture 200 may be fully or partially coated with the frication reducer.

The first surface 172 and the second surface 174 of a microfracture 170 refer to the two opposing surfaces created as a result of the microfracture 170 being formed.

In one or more embodiments, the method includes providing a sufficient time for the coated microfracture 200 to close. Because the coated microfractures 200 do not contain proppants, the coated microfractures 200 close over time due to the stresses within the formation. Providing a "sufficient time" means providing at least 6 hours, at least 12 hours, at least 24 hours, at least 2 days, at least 3 days, at least 4 days, at least 5 days, at least 10 days, at least 20 days at least 30 days, at least 6 months, at least 1 year, at least 2 years, at least 5 years, for the coated microfractures 200 to close. The closure of the coated microfracture 200 may occur due to a reduced stress acting on the fracture surfaces. The reduction of the stress may occur as a result of hydrocarbon extraction operation and depletion of hydrocarbon within the formation.

As a result of introducing the lubricating agent into the microfractures 170, coating at least a portion of a first surface 172 and a second surface 174 of the microfracture 170, and providing sufficient time for the coated microfracture 200 to close, the first surface 172 and the second surface 174 of the coated microfractures 200 misalign after the closure of the coated microfracture 200. The coating of the first surface 172 and the second surface 174 of the microfracture 170 may further stimulate additional shear fractures and generation of fractures 160 and microfractures 170.

Figure 3A:
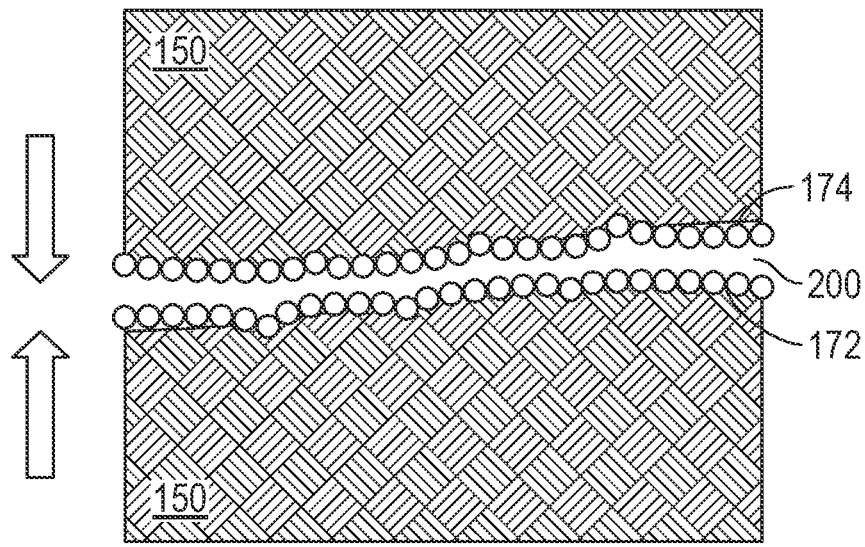
FIG. 3A-3B are diagrams that illustrate misalignment of microfracture surfaces coated with a lubricating agent in accordance with one or more embodiments.
Figure 3B:
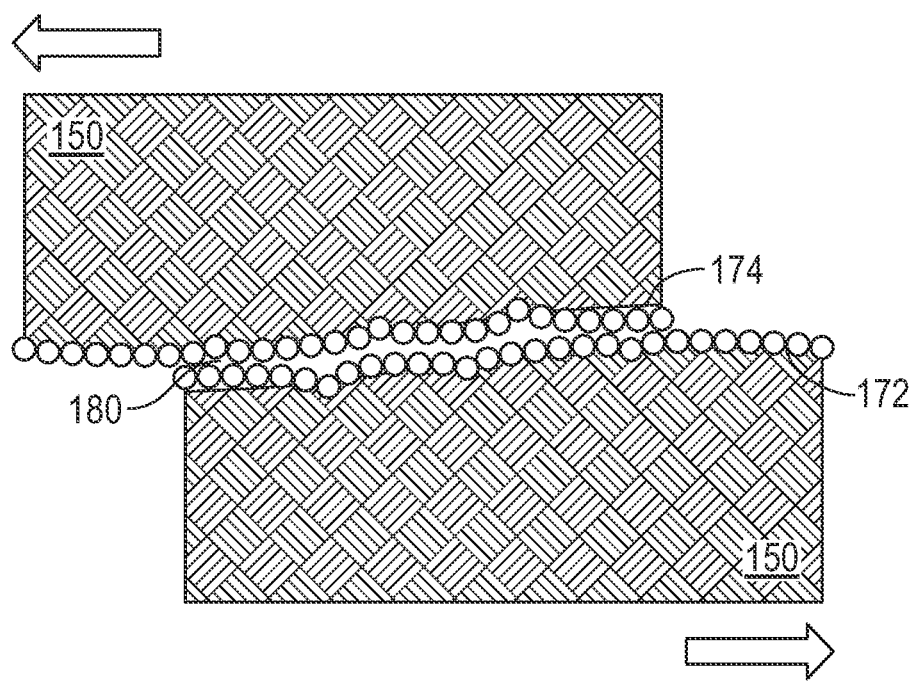

FIGS. 3A-3B are diagrams that illustrate misalignment of microfracture surfaces coated with a lubricating agent. A coated microfracture 200 having a first surface 172 and a second surface 174 within the formation 150 close over time (FIG. 3A). After the closure, the first surface 172 and the second surface 174 coated with the lubricating agent misalign due to the reduced surface friction and pressure applied to the coated microfracture 200 by the formation. The misalignment causes an opening 180 to form between the first surface 172 and the second surface 174 as a result of mismatched surface roughness or asperities (FIG. 3B). Because the misaligned surfaces of the closed coated microfracture create an opening 180, a fluid comprising hydrocarbon may flow out of the opening 180. The misaligned coated microfractures 200 allow additional hydrocarbon to be extracted from the formation 150, which results in a higher residual fracture conductivity and higher well productivity. Fracture conductivity is a measure of the property of a particular fracture to convey the produced fluids of the well, and is a function of a fracture permeability and a fracture width. FIG. 3B shows the misalignment of the first surface 172 and the second surface 174 in the horizontal direction. However, the surface misalignment of coated microfracture 200 may occur in any direction. For example, in case the coated microfracture 200 is formed a diagonal direction, and the misalignment of the surfaces of the coated microfracture 200 may also occur in a diagonal direction.

The misalignment of the first and second surfaces may occur immediately after the closure of the microfracture 170, or there may be a delay for the misalignment to occur. In one or more embodiments, the misalignment occurs at least 1 second after, at least 1 minute after, at least 1 hour after, at least 1 day after, at least 5 days after at least 10 days after, at least 20 days after, at least 30 days after, at least 6 months after, at least 1 year after, at least 2 years after, at least 5 years after, and at least 10 years after. The delayed misalignment may occur during the operations after the lubricating agent is introduced to the microfractures, such as well shut-in, pressure-cycling and hydrocarbon extraction processes.

Such delay of the surface misalignment may occur as a result of reduction in the stresses acting on the fracture plane. The stress reduction may occur as the total stress within the reservoir decreases during the hydrocarbon extraction operation, which may follow after the fracking operation. The lubricating agent provided on the surfaces of the microfracture reduces the surface friction of the microfracture, and as the stresses on the fracture plane decrease during the extraction operation, for example, the surfaces of the microfracture may misalign, further contributing to the productivity of hydrocarbons.

In one or more embodiments, the first surface 172 and the second surface 174 of the coated microfracture 200 misalign by at least 1 mm, at least 2 mm, at least 3 mm, at least 4 mm, at least 5 mm, or at least 10 mm.

In one or more embodiments, the method for improving oil and gas well productivity results in an increase in the fracture conductivity of the subterranean formation. In one or more embodiments, the increase in the fracture conductivity is at least 1%, at least 2%, at least 3%, at least 4%, at least 5%, at least 10%, at least 20%, or at least 50%. An increase in the fracture conductivity may be determined by obtaining a percentage difference of the fracture conductivity of a subterranean formation not subjected to the method for improving oil and gas well productivity (for example, the fracture conductivity of the subterranean formation before the method is conducted), and the fracture conductivity of the subterranean formation subjected to the method.

Encapsulated Lubricating Agent

In one aspect, embodiments disclosed herein relate to an encapsulated lubricating agent including a lubricating agent and an encapsulant encapsulating at least a portion of the lubricating agent.

In one or more embodiments, the lubricating agent contained in the encapsulated lubricating agent includes metal nanoparticles, such as nanoparticles of Cu, Fe, Al or a combination thereof.

In one or more embodiments, the lubricating agent contained in the encapsulated lubricating agent includes metal/metalloid oxide nanoparticles, such as nanoparticles of $TiO_2$, ZnO, CuO, $ZrO_2$, $CeO_2$, $Al_2O_3$, $SiO_2$, or a combination thereof.

In one or more embodiments, the lubricating agent contained in the encapsulated lubricating agent includes metal/metalloid oxide nanoparticles including a plurality of metals/metalloids ("multi-metal/metalloid oxide nanoparticles"). The multi-metal/metalloid oxide nanoparticles refer to as nanoparticles of metal/metalloid oxides having at least 2 types of metals/metalloids within the structure of the particles.

In one or more embodiments, the multi-metal/metalloid oxide nanoparticles include metal/metalloid oxide nanoparticles having a heterostructure, such as $ZnAl_2O_4$, and composite metal/metalloid oxide nanoparticles such as nanoparticles of $Al_2O_3/TiO_2$, $ZrO_2/SiO_2$ or a combination thereof.

In one or more embodiments, the encapsulant contained in the encapsulated lubricating agent includes, but is not limited to, hydrated polymers such as guar, chitosan and polyvinyl alcohol (PVA), and binders such as carboxymethyl cellulose and xanthan.

The lubricating agent may be encapsulated with the encapsulant by appropriate nano-encapsulation processes. The nano-encapsulation process may include a physical/mechanical encapsulation process and chemical encapsulation process.

The physical/mechanical encapsulation process may include forming micro- or nano-size droplets of the encapsulant, contacting the droplets of the encapsulant with the lubricating agent, and encapsulating the lubricating agent by transforming the physical attributes of the droplets such as the size of the droplet or the state of the droplets (for example, from liquid state to solid state). The physical/mechanical encapsulation process may include, but is not limited to, spray drying, prilling (spray congealing/spray chilling/spray cooling), coating, extrusion, coextrusion, and phase inversion.

The chemical encapsulation process may include chemically interacting the lubricating agent with the encapsulant, such as polymerization reactions with monomer dispersions. The chemical encapsulation process may include, but is not limited to, interfacial polymerization, interfacial polycondensation polymerization, emulsion polymerization and in-situ polymerization.

In one or more embodiments, the encapsulated lubricating agent includes the lubricating agent in an amount of about 30 wt % to about 50 wt %, such as in a range of from a lower limit selected from any one of 30, 35, and 40 wt % to an upper limit selected from any one of 45 and 50 wt %, where any lower limit may be paired with any upper limit.

In one or more embodiments, the encapsulated lubricating agent includes the encapsulant in an amount of about 50 wt % to about 70 wt %%, such as in a range of from a lower limit selected from any one of 50, 55, and 60 wt % to an upper limit selected from any one of 65 and 70 wt %, where any lower limit may be paired with any upper limit.

In one or more embodiments, a ratio of the lubricating agent and the encapsulant in the encapsulated lubricating agent is in a range of from about 1:1 to about 1:2.

The encapsulated lubricating agent may have a hydrophobic surface or a hydrophilic surface. The surface of the encapsulated lubricating agent may be hydrophobic in case an organic solvents, such as low-polar organic solvent are used, and may be hydrophilic in case water-based solvents are used.

In one or more embodiments, the encapsulated lubricating agent may be activated by time and/or various conditions within the formation.

In one or more embodiments, the encapsulated lubricating agent is a pressure-activated lubricating agent. The lubricating agent may be encapsulated with an encapsulant such that the encapsulant fractures and/or detaches from the lubricating agent upon exposure to an elevated pressure or stress, such as a stress generated by the closure of a microfracture. In one or more embodiments, the pressure-activated lubricating agent is encapsulated such that the encapsulant disintegrates upon exposure to a certain pressure/mechanical stress, such as a pressure in a range of from about 5000 to about 13000 psi. In one or more embodiments, the pressure-activated lubricating agent is encapsulated with an encapsulant which disintegrates upon exposure to a pressure in a range of from about 5000 to about 13000 psi, such as a lower limit selected from any one of 5000, 6000, and 7000 psi, to an upper limit selected from any one of 11000, 12000 and 13000 psi, where any lower limit may be paired with any upper limit.

In one or more embodiments, the encapsulated lubricating agent is a time-activated lubricating agent. The lubricating agent may be encapsulated with an encapsulant which disintegrates after a certain amount of time, such as after about 1 minute to after about 10 days. In one or more embodiments, the time-activated lubricating agent is encapsulated with an encapsulant which disintegrates or dissolves after a time duration in a range from about 1 minutes to 10 days, such as a lower limit selected from any one of 1 minute, 5 minutes, 10 minutes, 30 minutes, 1 hour, 5 hours, 10 hours, 20 hours, 24 hours, to an upper limit selected from any one of 1 hour, 5 hours, 10 hours, 20 hours, 24 hours, 2 days, 5 days and 10 days, where any lower limit may be paired with any mathematically compatible upper limit. The activation time for the time-activated lubricating agent may be determined from the depth and the temperature of the target location to which the encapsulated lubricating agent is introduced.

In one or more embodiments, the encapsulated lubricating agent is a temperature-activated lubricating agent. The lubricating agent may be encapsulated with an encapsulant which disintegrates or dissolves upon exposure to a certain temperature, such a temperature in a range of from about 40 to about 200° C. In one or more embodiments, the temperature-activated lubricating agent is encapsulated with an encapsulant which disintegrates upon exposure to a temperature in a range of about 40 to 200° C., such as a lower limit selected from any one of 40, 50, 60, 70, 80, 90 and 100° C., to an upper limit selected from any one of 80, 90, 100, 125, 150, 175 and 200° C., where any lower limit may be paired with any mathematically compatible upper limit.

In one or more embodiments, the encapsulated lubricating agent is a chemically-activated lubricating agent. The lubricating agent may be encapsulated with an encapsulant which disintegrates or dissolves upon exposure to a certain substance or chemical, such as a solvent or an additive. In one or more embodiments, the chemically-activated lubricating agent may be encapsulated with an encapsulant which disintegrates or dissolves upon exposure to a pH condition of about 4 to about 7.

In one or more embodiments, the encapsulated lubricating agent may be activated by a combination of any of the factors described above. For Example, the lubricating agent may be a chemically-activated, pressure-activated, time-activated and temperature-activated lubricating agent.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke means-plus-function for any limitations of any of the claims herein, except for those in which the claim expressly uses the words 'means for' together with an associated function.

What is claimed is:

1. A method for improving oil and gas well productivity, comprising:
   introducing a lubricating agent into a microfracture in a subterranean formation;
   coating at least a portion of a first surface and a second surface of the microfracture with the lubricating agent to produce a coated microfracture; and
   providing a sufficient time for the coated microfracture to close,
   wherein the introducing, the coating and the providing cause the first surface and the second surface of the coated microfracture to misalign after the closure of the coated microfracture and an opening to form between the first surface and the second surface, and
   wherein the lubricating agent comprises at least one selected from the group consisting of:
      heterostructure metal/metalloid oxide nanoparticles, and
      an encapsulated lubricating agent comprising at least one of the heterostructure metal/metalloid oxide nanoparticles and composite metal/metalloid oxide nanoparticles as the lubricating agent, and an encapsulant encapsulating at least a portion of the lubricating agent,
   wherein the encapsulated lubricating agent comprises:
      30 to 50 wt % of the lubricating agent; and
      50 to 70 wt % of the encapsulant.

2. The method of claim 1, wherein the lubricating agent further comprises nanoparticles of at least one of graphene, a metal, and a metal/metalloid oxide.

3. The method of claim 1, wherein the lubricating agent further comprises nanoparticles of a composite metal/metalloid oxide.

4. The method of claim 1, wherein the encapsulated lubricating agent further comprises nanoparticles of at least one of graphene, a metal, and a metal/metalloid oxide as the lubricating agent.

5. The method of claim 1, wherein the encapsulated lubricating agent comprises at least one of a pressure-activated lubricating agent, a time-activated lubricating agent, a temperature-activated lubricating agent and a chemically-activated lubricating agent.

6. The method of claim 1, wherein a surface of the encapsulated lubricating agent is hydrophilic.

7. The method of claim 1, wherein a surface of the encapsulated lubricating agent is hydrophobic.

8. The method of claim 1, further comprising mixing the lubricating agent with a fluid to produce a lubricating agent mixture prior to being introduced to the microfracture.

9. The method of claim 8, wherein a concentration of the lubricating agent in the lubricating agent mixture is in a range of from 0.001 wt % to 5 wt %.

10. The method of claim 1, wherein the coated microfracture misaligns by a distance of at least 1 mm after the closure.

\* \* \* \* \*